(12) United States Patent
Grande Saez (10) Patent No.: US 12,006,072 B2
(45) Date of Patent: Jun. 11, 2024

(54) MULTIPLE HOLD-DOWN AND RELEASE DEVICE FOR SPACECRAFT, AND METHODS FOR RELEASING A SPACECRAFT FROM A DISPENSER OF A LAUNCHER AND FOR INSTALLING A MULTIPLE HOLD-DOWN AND RELEASE DEVICE FOR SPACECRAFT

(71) Applicant: AIRBUS DEFENCE AND SPACE S.A., Madrid (ES)

(72) Inventor: Eugenio Grande Saez, Madrid (ES)

(73) Assignee: AIRBUS DEFENCE AND SPACE S.A., Madrid (ES)

(*) Notice: Subject to any disclaimer, the term of this patent is extended or adjusted under 35 U.S.C. 154(b) by 303 days.

(21) Appl. No.: 17/617,862

(22) PCT Filed: Jun. 12, 2019

(86) PCT No.: PCT/ES2019/070412
§ 371 (c)(1),
(2) Date: Dec. 9, 2021

(87) PCT Pub. No.: WO2020/249831
PCT Pub. Date: Dec. 17, 2020

(65) Prior Publication Data
US 2022/0242595 A1    Aug. 4, 2022

(51) Int. Cl.
*B64G 1/64* (2006.01)
(52) U.S. Cl.
CPC .............. *B64G 1/641* (2013.01); *B64G 1/645* (2013.01); *B64G 1/643* (2023.08)
(58) Field of Classification Search
CPC ........ B64G 1/641; B64G 1/645; B64G 1/643; B64G 1/2228; B64G 1/642; B64G 1/6457; B64G 1/222
See application file for complete search history.

(56) References Cited

U.S. PATENT DOCUMENTS 3,116,895 A * 1/1964 Mitchum, Jr. .......... F16H 21/06
403/321
4,219,171 A * 8/1980 Rudmann .............. B64G 1/646
244/172.4

(Continued)

FOREIGN PATENT DOCUMENTS

CN    106628270 A    5/2017
EP    2213572 A1    8/2010

(Continued)

OTHER PUBLICATIONS

A. Jonsson et al., "Enabling Solutions for Small Satellite Space Access", 13th Reinventing Space Conference: 273-280 (2015).

(Continued)

*Primary Examiner* — Medhat Badawi
*Assistant Examiner* — Vicente Rodriguez
(74) *Attorney, Agent, or Firm* — Merchant & Gould P.C.

(57) ABSTRACT

A multiple hold-down and release device for spacecraft includes a central structure including a central section with a cylindrical inner hole, an inner axial shaft insertable into the inner hole. A release bolt aligns with the inner axial shaft. A main bushing is partially arranged inside the inner hole and axially guided by guiding bushings on the main bushing and the inner hole. The main bushing includes a protrusion and internal retainer spring. Arms protruding from the central section are axially preloaded by a pusher opposite the central section. Connecting levers each connect to the end of the corresponding arm by the pusher. Hold-down assemblies on the periphery of the device each include a hold-down support and a fastener with conical contact surfaces, a torsion spring around a torsion spring shaft, and articulated with the corresponding hold-down support by the corresponding torsion spring shaft.

12 Claims, 6 Drawing Sheets

(56) References Cited

U.S. PATENT DOCUMENTS

| | | | |
|---|---|---|---|
| 4,664,344 A | | 5/1987 | Harwell et al. |
| 4,682,804 A | * | 7/1987 | Palmer .................. B64G 1/645 |
| | | | 294/82.26 |
| 5,040,748 A | * | 8/1991 | Torre .................... B64G 1/641 |
| | | | 244/137.4 |
| 5,199,672 A | | 4/1993 | King et al. |
| 5,397,244 A | * | 3/1995 | Generoli ............... B64G 1/641 |
| | | | 439/248 |
| 10,232,960 B2 | * | 3/2019 | Vezain .................. B64G 1/646 |
| 2016/0114912 A1 | | 4/2016 | Vezain et al. |

FOREIGN PATENT DOCUMENTS

| | | |
|---|---|---|
| EP | 3184439 A1 | 6/2017 |
| RU | 2111905 C1 | 5/1998 |
| RU | 2396191 C1 | 8/2010 |

OTHER PUBLICATIONS

International Search Report for PCT/ES2019/070412 (dated Mar. 6, 2020).

* cited by examiner

MULTIPLE HOLD-DOWN AND RELEASE DEVICE FOR SPACECRAFT, AND METHODS FOR RELEASING A SPACECRAFT FROM A DISPENSER OF A LAUNCHER AND FOR INSTALLING A MULTIPLE HOLD-DOWN AND RELEASE DEVICE FOR SPACECRAFT

This application is a National Stage of PCT/ES2019/070412, filed Jun. 12, 2019, which application is incorporated herein by reference. To the extent appropriate, a claim of priority is made to the above-disclosed application.

FIELD OF THE INVENTION

The invention refers to a device for providing hold down and structural continuity between a spacecraft and a launcher, which is also suitable for providing separation of the spacecraft from the launcher. The invention also refers to a method to remove a spacecraft from a dispenser of a launcher and to a method to install a multiple hold down and separation device for spacecraft.

BACKGROUND OF THE INVENTION

The market for small spacecraft is continuously growing. Constellations of hundreds of small spacecraft in the range from 50 to 800 kg are being developed. To put this high number of small spacecraft in orbit the launcher provides a structure called dispenser in charge of providing a stiff connection of the spacecraft to the launcher during flight, and to provide a safe separation and distancing between the spacecraft and the launcher, and between the spacecraft themselves.

Current solutions for this problem are a central cylinder or square, hexagonal or octagonal prisms attached to the upper part of the last stage of the launcher carrying one or more spacecraft on each face of the prism.

With this layout each launcher can put a number typically from 2 to 32 spacecraft in orbit, depending on the number of faces of the dispenser and on the number of rows of spacecraft (typically from 1 to 4).

In the current solutions each spacecraft is attached to the dispenser to 4 to 6 points named hold down and release mechanisms that preload the spacecraft to the dispenser.

The interface of these small spacecraft with the dispenser is not standardized and at this moment the launcher has to provide flexibility in the definition of the interfaces with this kind of platforms.

Each hold down and release mechanism is activated by one dedicated separation nut close to the spacecraft interface, resulting in some cases in hundreds of separation nuts per dispenser. The separation of these discrete hold down and release mechanisms generates a high shock during the separation due to the rapid release of the preload and the pyrotechnic actuator close to the spacecraft interface.

There are systems to reduce the shock by slowing down the release of the preload but increasing the activation time and dispersion, penalizing the simultaneous separation of the four hold down and release mechanisms. This simultaneous separation is highly desired so that the distancing system usually formed by spring can eject the spacecraft with the minimum angular velocity minimizing the risk of collision of all the spacecraft during the separation In this kind of dispensers for large constellations the launcher has to be prepared to manage a big amount of separation signals (two per separation nut for redundancy). The initiation system could limit the number of separation in some cases. In other cases the launcher has to install very expensive controller systems on the dispenser, converters and harness to manage the separations penalizing the cost. Another disadvantage for these systems is that many parts remain on the spacecraft after separation.

These new satellite platforms are driven by cost and effective solutions have to be addressed. The high reliability required to each one of the four pyrotechnic actuators per spacecraft results in high percentage of the total cost of the separation system and the dispenser.

EP 2298648 A discloses a device for the restraint and release of a deployable body mounted on a support structure, the device being operable between a stowed condition and a released condition, and comprising: —a pair of subassemblies, each for being attached to either the deployable body or the support structure, these subassemblies comprising mating surfaces which interlock with one another in the stowed condition to substantially prevent lateral movement of the deployable body relative to the support structure; —a releasable tensioned element which is connected to both of the subassemblies, exerting a compressive pre-load action on the said subassemblies that keep them together; —a force measurement system that allows monitoring the cited compressive pre-load action applied; —a releasing device for releasing the cited pre-load, allowing the free separation of the subassemblies; it further comprises a pre-load application mechanism embedded in the device such that it applies a substantially pure-tension pre-load to the releasable tensioned element.

RU 2111905 C1 discloses a device for separating the rocket stage and the spacecraft to be separated, containing a pyroactuator with a piston installed in it, connected to the locking devices of the connecting elements, in which the pyroactuator is equipped with a split ring, the connecting elements are made in the form of a rod arranged in series, installed inside the piston with the possibility of their mutual movement, and a rod connected to the rod through a rotary knot, with the split ring installed on the piston between the shoulder of the piston and the end of the piston fixed to the rod.

RU 2396191 C1 discloses a payload separation system containing a detachable retention device installed between the load-bearing structure and the payload, which includes discretely placed mechanical locks with retaining and locking links on the load-bearing structure of the device, connected with a rotary multi-beam star, fixed with the possibility of rotation in the center of the circle of the locks' installation and held in the initial position from rotation by means of a pyroelectric means, as well as spring pushers for separation. The system of separating the load-bearing structure includes mechanical locks with retaining and locking links connected with the rotary multi-beam star, fixed with the possibility of rotation in the center of the circle of the locks' installation and held in the initial position from rotation by a pyroelectric means.

EP 2213572 A1 discloses a "Device for holding down a mobile structure to a spacecraft" that comprises a stationary structure fixed to the spacecraft, an actuator, a releasable member driven to movement in an axial direction relative to the stationary structure upon activation of the actuator and a locking assembly arranged to hold down or release the mobile structure depending on the axial position of the releasable member. The locking assembly comprises a plurality of circumferentially arranged locking members being movable in a radial direction into and out of engagement with the mobile structure at "V"-shaped groves that are arranged on a ring shaped plate which is attached to the appendage, the locking members being connected to the releasable member via first levers, such that the axial movement of the releasable member and the radial movement of the locking member are coupled with each other by way of a bent lever type mechanism.

Other separation systems are disclosed in the document "Enabling Solutions for Small Satellite Space Access" (13th Reinventing Space Conference, November 2015), by Andreas Jonsson and Magnus Engström, in which several systems for multiple satellite launches are included. One of these systems consists of 4 hold down mechanisms and a plate structure, but with only one release point.

Accordingly, there is a need to provide a multiple hold down and separation device for spacecraft that reduces the output shock, reduces the number of pyrotechnic devices and therefore the cost, improves the simultaneous release of the discrete points, minimising the risk of collision during the separation and reducing the flyaway mass that is added to the spacecraft after the separation and that can be easily tested many times on ground improving the reliability of the design.

SUMMARY OF THE INVENTION

The object of the invention is to provide a multiple hold down and separation device for spacecraft that overcomes the mentioned drawbacks.

The invention provides a multiple hold down and separation device for spacecraft that comprises:
- a central structure comprising:
  - a central section with an inner hole with a cylindrical surface comprising an end stop, an inner axial shaft being provided into the inner hole, the central section also comprising a release bolt aligned with the inner axial shaft, a main bushing at least partly arranged inside the inner hole and axially guided by means of a guiding system comprising a guiding bushing on the main bushing and a guiding bushing on the surface of the inner hole, the main bushing comprising a protrusion on its outer surface, a retainer spring being provided inside the main bushing, and
  - at least two arms protruding from the central section axially preloaded by pusher means at the end opposite the central section,
- a support connected to the central section of the central structure and comprising attaching means,
- an actuator connected to the release bolt of the central section of the central structure,
- at least two connecting levers, each one of the connecting levers connected to the end of the corresponding arm of the central structure by means of the pusher means, and
- at least two hold-down assemblies placed on the periphery of the device, each one of them comprising a hold-down support and a hold-down both of them with conical mating surfaces, each hold-down support comprising a torsion spring around a torsion spring axis, each corresponding lever being articulated with the corresponding hold-down support through the corresponding torsion spring axis.

The invention also comprises a method to release a spacecraft from a dispenser of a launcher of claim 11, and a method to install a multiple hold down and separation device for spacecraft of claim 12.

Another advantage of the device of the invention is that it is a modular device. It allows several configurations with different central structures, the rest of the elements being common.

It is also a versatile device, which allows to change the number of arms and their length according to the different needs.

Other characteristics and advantages of the present invention will be clear from the following detailed description of several embodiments illustrative of its object in relation to the attached figures.

DETAILED DESCRIPTION OF THE INVENTION

The invention discloses a device 1 used to hold down and release a spacecraft 27 at the desired number and location of discrete points by the opening of a single actuator 16 at the central point of the device 1.

Figure 3:
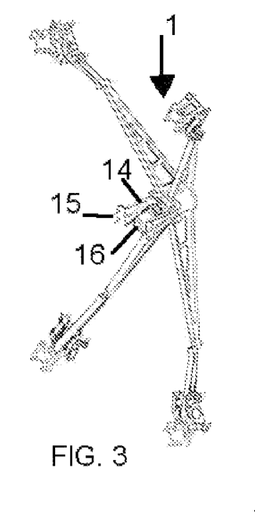
FIGS. 3 to 5 show several embodiments of the multiple hold down and separation device of the invention.
Figures 4, 5:
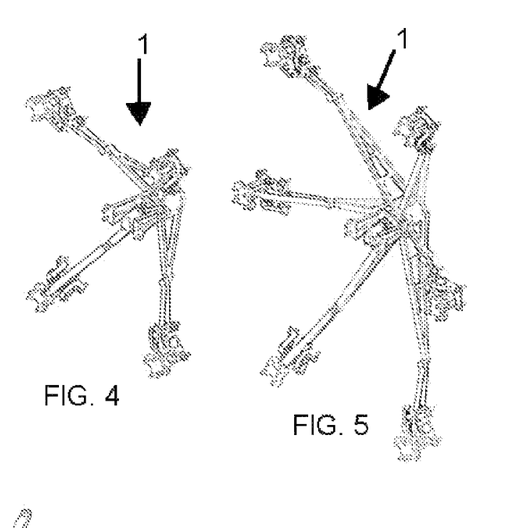

The multiple hold down and separation device 1 for spacecraft of the invention (illustrated, for instance, in FIGS. 3, 4 and 5) basically comprises several elements:
- a central structure 2,
- a support 14 connected to the central structure 2,
- an actuator 16 connected to the central structure 2,
- several connecting levers 17, and
- several hold-down assemblies 19 placed on the periphery of the device 1.

Figure 1:
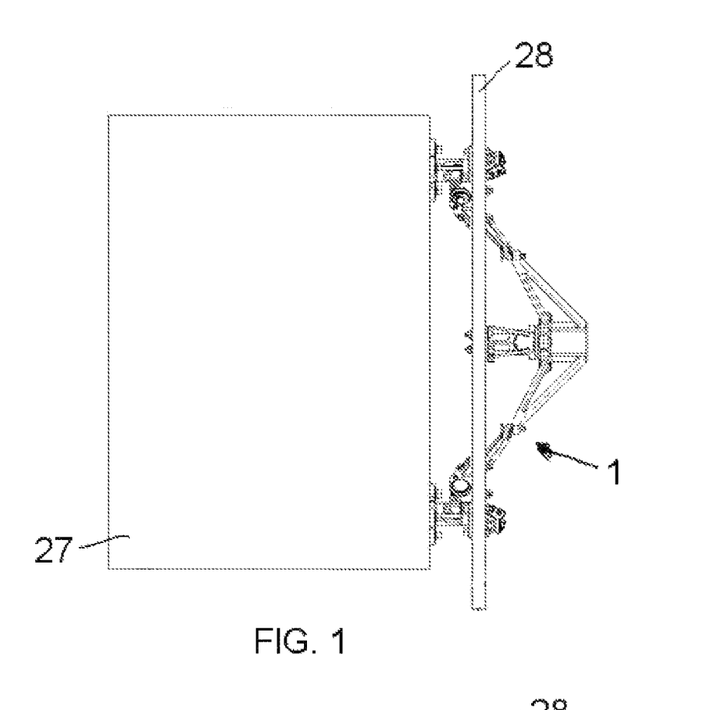
FIG. 1 shows a view of the multiple hold down and separation device of the invention attaching a spacecraft to the dispenser of a launcher (closed mode).
Figure 2:
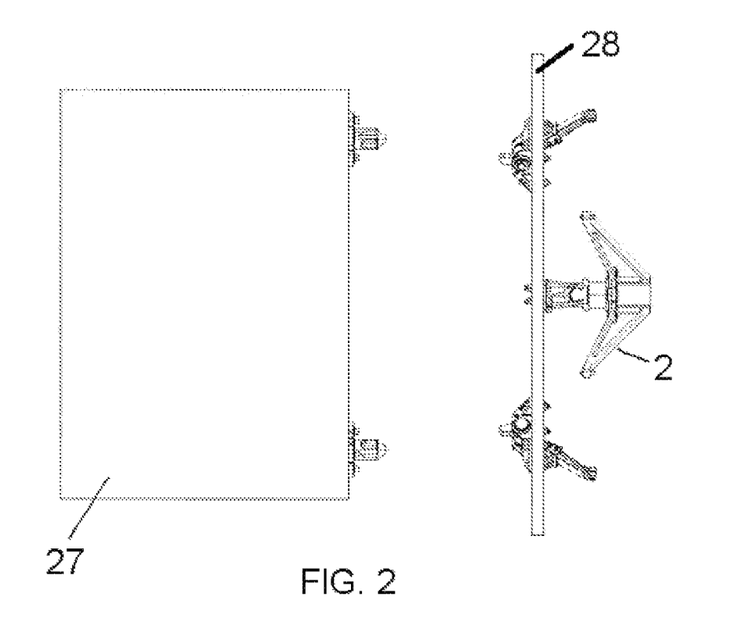
FIG. 2 shows the elements of FIG. 1 once the spacecraft has been released from the dispenser (open mode).

FIG. 1 shows the multiple hold down and separation device 1 of the invention in a closed mode, attaching a spacecraft 27 to the dispenser 28 of a launcher. FIG. 2 shows the elements of FIG. 1 once the spacecraft 27 has been released from the dispenser 28 (i.e., when the multiple hold down and separation device 1 is in an open mode).

Figures 6, 7, 8:
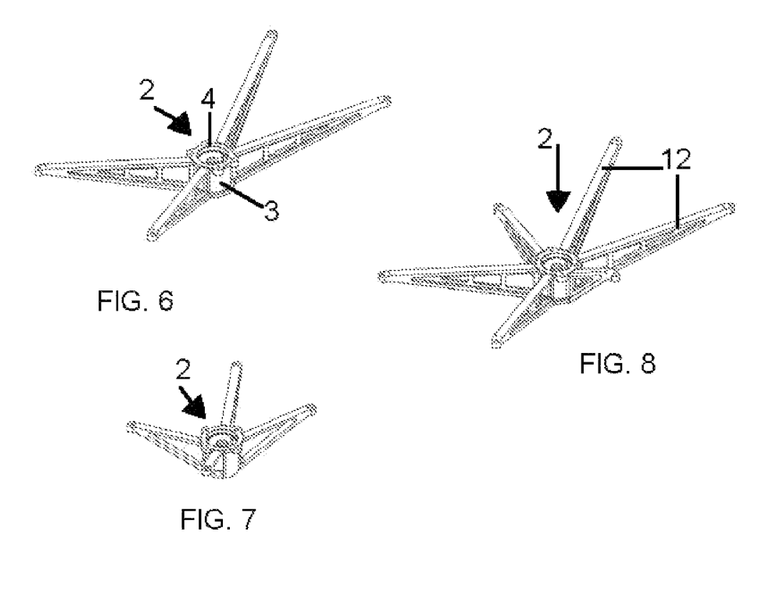
FIGS. 6 to 8 show several embodiments of the central structure of the multiple hold down and separation device of the invention.
Figure 9:
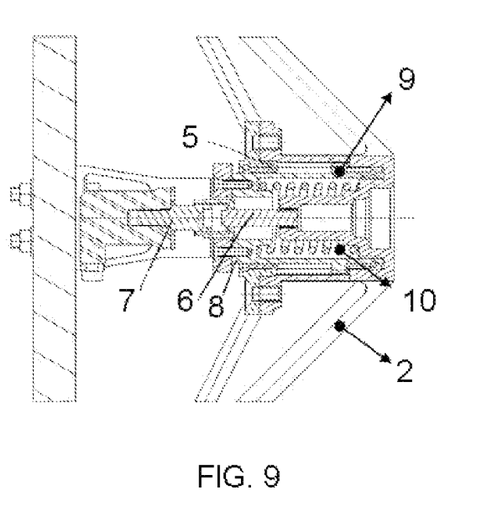
FIG. 9 shows a detail of the multiple hold down and separation device of the invention in a closed mode.

The main elements of the central structure 2 can be seen in FIGS. 6, 7 and 8, corresponding to different embodiments. The central structure 2 comprises:

A central section 3 with an inner hole 4 with a cylindrical surface comprising an end stop 5, an inner axial shaft 6 being provided into the inner hole 4. The central section 3 also comprises a release bolt 7 aligned with the inner axial shaft 6, a main bushing 8 at least partly arranged inside the inner hole 4 and axially guided by means of a guiding system comprising a guiding bushing 11 on the main bushing 8 and a guiding bushing 11' on the surface of the inner hole 4. The main bushing 8 comprises a protrusion 9 on its outer surface, and a retainer spring 10 is provided inside the main bushing 8.

Figure 13:
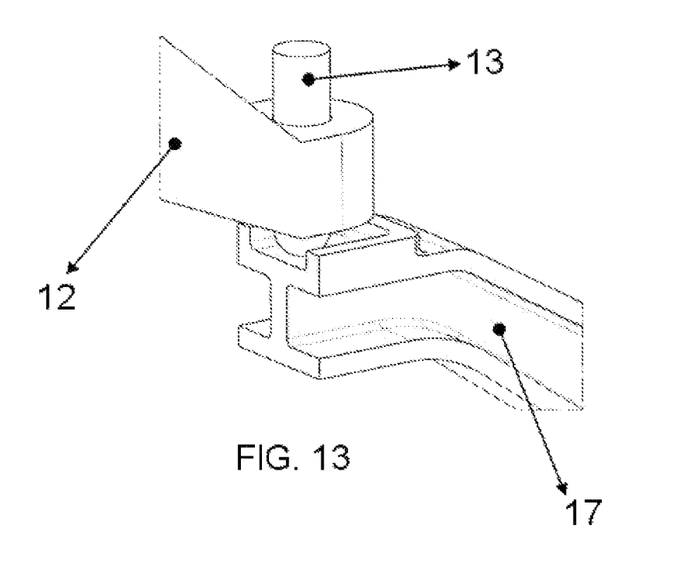
FIG. 13 shows a detail of the connection between an arm of the central structure and a connecting lever.
Figure 14:
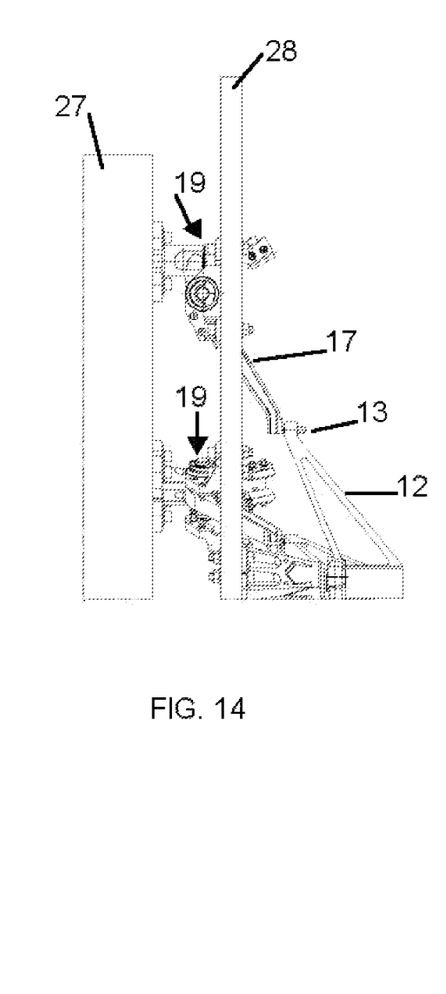
FIG. 14 shows a detail of the multiple hold down and separation device of the invention in a closed mode.

At least two arms 12 protruding from the central section 3. The arms 12 can be integral part of the central section 3 or can be joined to the central section 3 as separate parts (for instance, screwed to it). These arms 12 are axially preloaded by pusher means 13 at the end of the arm 12 opposite the central section 3. FIG. 13 shows an arm 12 and a connecting lever 17, with a tensioning pusher as pusher means 13.

FIGS. 6 and 7 show a central section 3 with four arms 12, and FIG. 8 shows a central section 3 with six arms 12.

The support 14 is connected to the central section 3 of the central structure 2 and comprises attaching means 15, suitable for attachment to the dispenser 28.

The actuator 16 is connected to the release bolt 7 of the central section 3 of the central structure 2, when the device 1 is in the closed mode.

Several types of actuator 16 are feasible to release the release bolt 7:

Non explosive actuator named NEA (from EBAD company and others) that is a mechanism allowing to carry a very high tensile load by a release bolt 7 held in place by two separable spool halves which are in turn held together by tight winding of restraining wire. The restraint wire is held in place by redundant electrical fuse wires. When the nominal electrical current of 4 Amp during 25 ms is applied, the restraint wire unwinds allowing the spool halves to separate releasing the release rod and the associated preload.

Separation nut or pyrotechnic actuator (from Pyroalliance, Chemring, EBAD and others) that maintains the preload of the release bolt 7 by threaded segments that are moved away by the pressure generated by pyrotechnic initiators upon an electric impulse of 5 Amp during at least 10 ms Other options to maintain and release the release bolt 7 as bolt cutters, frangible bolts and nuts are also feasible.

The device 1 also comprises several connecting levers 17 (at least two ones). Each one of the connecting levers 17 is connected to the end of the corresponding arm 12 of the central structure 2 by means of the pusher means 13.

Figure 11:
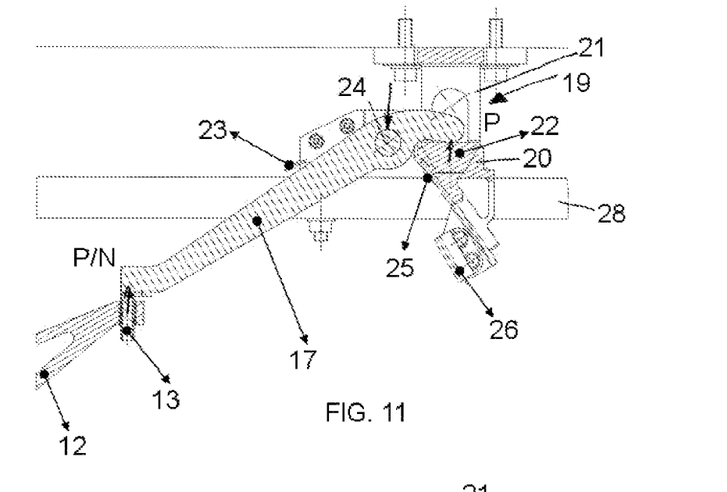
FIG. 11 shows a view of several elements of the multiple hold down and separation device of the invention in a closed mode.
Figure 12:
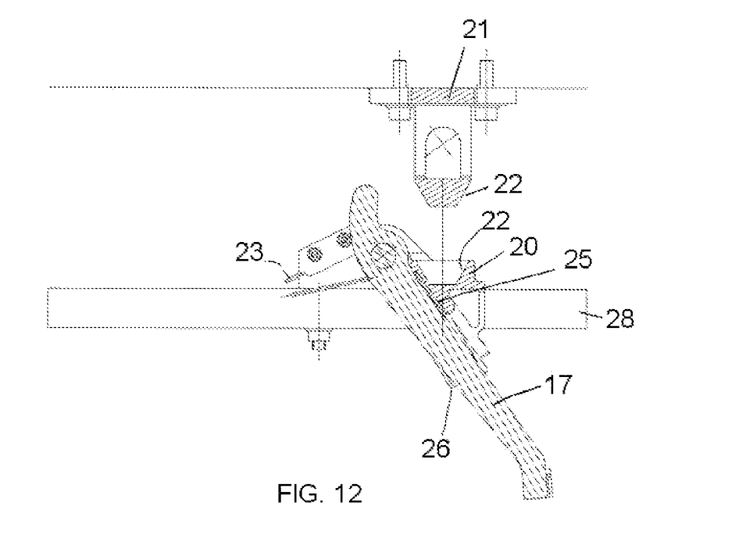
FIG. 12 shows a view of several elements of the multiple hold down and separation device of the invention in an open mode.

The device 1 also comprises at least two hold-down assemblies 19 placed on the periphery of the device 1. Each hold-down assembly 19 comprises a hold-down support 20 and a hold-down 21, both of them with conical mating surfaces 22 (FIGS. 11 and 12). Each hold-down support 20 comprises a torsion spring 23 around a torsion spring axis 24. Each corresponding lever 17 is articulated with the corresponding hold-down support 20 through the corresponding torsion spring axis 24.

In FIGS. 11 and 12 it can be seen that the hold-down support 20 additionally comprises an end stop 25 that limits the angle of rotation of the lever 17 around the corresponding torsion spring axis 24. It can also be seen that the hold-down support 20 additionally comprises a latch 26 suitable for retaining the corresponding lever 17, in order to prevent the lever 17 from retracting once it reaches its final position.

The device 1 of the invention provides hold down and structural continuity between the spacecraft 27 and the launcher 28 at the desired number and location of discrete points (hold downs) and is released simultaneously by the activation of a unique actuator 16 at the central point.

The device 1 comprises a central structure 2 with a number of arms 12 equal to the number of the desired hold down discrete points N axially preloaded with a force P.

The number and the location of the discrete points can be selected for each mission by the only modification of the geometry of this central structure 12, being the rest of the pieces fully identical.

This structure 12 is axially preloaded in a uniform way by applying torque sequentially to the tensioning bolts (pusher means 13) at the end of the arms 12. This preload is P/N.

Each clamping system is composed by a connecting lever 17 in charge of the amplification and transmission of the preload from each arm 12 of the central structure 2 to the hold down 21. This amplification is achieved by the law of the lever pivoting along a bearing axis (the torsion spring axis 24). The mechanical advantage of the lever MA is therefore the ratio of distances from the bearing axis to where the input and output forces are applied to the lever 17. Then the preload introduced to the hold down 21 is MA×P/N. If the ratio of distances is selected in such a way that MA~N the resulting preload introduced to the hold down 21 is the same that the preload at the central point P. This allows to use the same actuator 16 for this device 1 as the one used for single hold downs, maintaining the commonality.

Each hold down 21 comprises a classical cone to cone 22 preloaded to withstand both the lateral and axial external loads.

Figure 10:
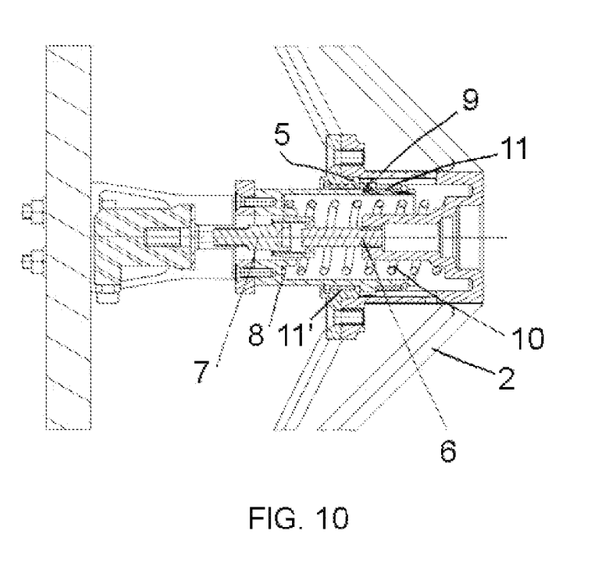
FIG. 10 shows a detail of the multiple hold down and separation device of the invention in an open mode.
Figure 15:
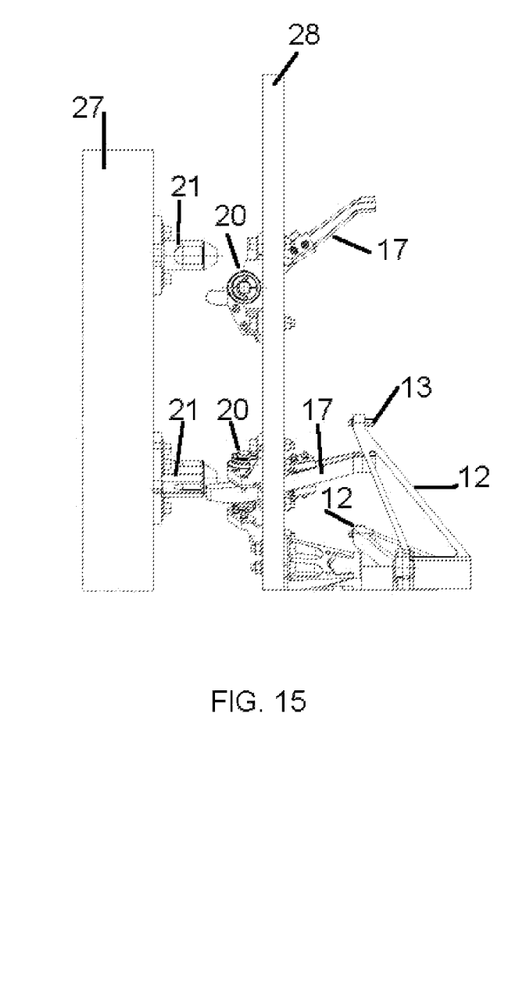
FIG. 15 shows a detail of the multiple hold down and separation device of the invention in an open mode.

In order to release a spacecraft 27 from a dispenser 28 of a launcher, a method can be used that uses a multiple hold down and separation device 1 for spacecraft of the invention, such that in a hold down position the spacecraft 27 is attached to the dispenser 28 at a number of discrete points by means of the corresponding hold-downs 21, and the support 14 that comprises the attaching means 15 and the hold-down supports 20 are attached to the dispenser 28. The method comprises the following steps:

electrical command from the launcher to activate the actuator 16 by means of a line connecting the launcher and the actuator 16, the release bolt 7 is released and the central section 3 of the central structure 2 moves axially by means of its elastic energy and the retainer spring 10 until the protrusion 9 of the bushing 8 contacts the end stop 5 of the cylindrical surface of the inner hole 4, the arms 12 of the central structure 2 moving with the central section 3 (FIG. 2, FIG. 10), the connecting levers 17 are released from the arms 12 of the central structure 2 and rotate by means of its elastic energy and the torsional springs 23 (FIG. 12, FIG. 15), and the end of each lever 17 is released from the corresponding hold-down 21 to unlock the corresponding hold-down 21, allowing the separation of the spacecraft 27 from the dispenser 28 (FIG. 12, FIG. 15).

In effect, the release of the device 1 starts with the activation of the actuator 16 (for instance, a separation nut). In an embodiment, this actuator 16 is activated in flight by an electrical signal coming from the launcher that is converted into a mechanical pressure inside the separation nut by standard pyrotechnic initiators. This pressure can be also introduced directly in the chamber of the separation nut with nitrogen gas for ground testing.

The movement of the central structure 2 is axially guided by two low friction guiding bushings 11, 11' and pin/slots to prevent the rotation.

At the end of the displacement the central structure 2 is mechanically stopped.

An internal retainer spring 10 between the central structure 2 and the fixed point of the launcher keeps the central structure 2 at the open mode after the release.

The opening of the central structure 2 relaxes the preload at the connecting levers 17 and therefore at the hold downs 21 and let the connecting levers 17 free to rotate along the bearing axis. The energy for this rotation movement comes mostly from their elastic energy. At the end of the rotation travel the connecting levers 17 are stopped by an end stop 25 (for instance, a teflon stopper) to reduce the shock of this impact. The connecting levers 17 are maintained at their open mode by two (left and right) torsional springs 23 at each bearing.

The connecting lever 17 at the open mode provides enough clearance to allow the cones 22 attached to the spacecraft 27 to be safely released.

This device 1 reduces the number of separation nuts, initiators, harness and separation management electronic controllers by a factor of N being N the desired number of discrete points, maintaining the preload P (if proper geometrical ratios are selected to have MA~N) and therefore the load capability of each hold down 21 and reducing the output shock to negligible levels: one single pyrotechnic device per spacecraft 27 located much far from the spacecraft interfaces.

The actuator 16 can be activated on ground with cold gas hundreds of times without refurbishment. The pressure can be introduced directly in the chamber of separation nut with nitrogen gas for ground testing, so it is possible to perform a high number of low-cost tests with this device on ground to improve the final reliability of the design.

In order to install a multiple hold down and separation device 1 for spacecraft, a method can be used that uses a multiple hold down and separation device 1 for spacecraft of the invention and comprises the following steps:
- attaching the support 14 and the hold-down supports 20 to the dispenser 28 of a launcher,
- attaching the hold-downs 21 to the spacecraft 27,
- putting the central structure 2 in the closed position with the released bolt 7 attached to the actuator 16, and
- applying a torque to the pusher means 13 placed at the end of each arm 12 of the central structure 2.

Although the present invention has been fully described in connection with preferred embodiments, it is evident that modifications may be introduced within the scope thereof, not considering this as limited by these embodiments, but by the contents of the following claims.

The invention claimed is:

1. A multiple hold down and separation device for spacecraft, comprising:
- a central structure comprising:
  - a central section with an inner hole with a cylindrical surface comprising an end stop, an inner axial shaft provided into the inner hole, the central section comprising a release bolt aligned with the inner axial shaft, a main bushing at least partly arranged inside the inner hole and axially guided by means of a guiding system comprising a guiding bushing on the main bushing and a guiding bushing on the surface of the inner hole, the main bushing comprising a protrusion on an outer surface, and a retainer spring provided inside the main bushing, and
  - at least two arms protruding from the central section axially preloaded by a pusher at an end opposite the central section,
- a support connected to the central section of the central structure and comprising an attachment device,
- an actuator connected to the release bolt of the central section of the central structure,
- at least two connecting levers, each one of the connecting levers connected to an end of a corresponding arm of the central structure by the pusher, and
- at least two hold-down assemblies placed on a periphery of the multiple hold down and separation device, each of the at least two hold-down assemblies comprising a hold-down support and a hold-down both of the hold-down and the hold-down support comprising conical mating surfaces, each hold-down support comprising a torsion spring around a torsion spring axis, each corresponding lever articulated with a corresponding hold-down support through a corresponding torsion spring axis.

2. The multiple hold down and separation device for spacecraft, according to claim 1, further comprising an end stop on each hold-down support limiting an angle of rotation of the lever around the corresponding torsion spring axis.

3. The multiple hold down and separation device for spacecraft, according to claim 1, further comprising a latch on each hold-down support for retaining a corresponding lever.

4. The multiple hold down and separation device for spacecraft, according to claim 1, comprising two arms in the central structure and two hold-down assemblies.

5. The multiple hold down and separation device for spacecraft, according to claim 1, comprising four arms in the central structure and four hold-down assemblies.

6. The multiple hold down and separation device for spacecraft, according to claim 5, in which the hold-down assemblies are arranged in a rectangular configuration.

7. The multiple hold down and separation device for spacecraft, according to claim 5, in which the hold-down assemblies are arranged in a square configuration.

8. The multiple hold down and separation device for spacecraft, according to claim 1, comprising six arms in the central structure and six hold-down assemblies arranged in a hexagon configuration.

9. The multiple hold down and separation device for spacecraft, according to claim 1, wherein the actuator is a non-explosive actuator or a pyrotechnic actuator.

10. The multiple hold down and separation device for spacecraft, according to claim 1, wherein the arms protruding from the central section are integral parts of the central section or are separate parts joined to the central section.

11. A method to release a spacecraft from a dispenser of a launcher, the method using the multiple hold down and separation device for spacecraft of claim 1, wherein in a hold down position the spacecraft is attached to the dispenser at a plurality of discrete points by corresponding hold-downs, and the support comprising the attachment device and the hold-down supports are attached to the dispenser, the method comprising the following steps:
- electrically commanding from the launcher to activate the actuator by a line connecting the launcher and the actuator,
- releasing the release bolt and the central section of the central structure moves axially by elastic energy and the retainer spring until the protrusion of the main bushing contacts the end stop of the cylindrical surface of the inner hole, the arms of the central structure moving with the central section, releasing the connecting levers from the arms of the central structure and are rotated by elastic energy and the torsion springs, and releasing an end of each lever from the corresponding hold-down to unlock the corresponding hold-down, allowing separation of the spacecraft from the dispenser.

12. A method to install a multiple hold down and separation device for spacecraft, the method using the multiple hold down and separation device for spacecraft of claim 1, comprising the following steps:

attaching the support and the hold-down supports to a dispenser of a launcher, attaching the hold-downs to the spacecraft, putting the central structure in a closed position with the release bolt attached to the actuator, and applying a torque to the pusher means placed at an end of each arm of the central structure.

* * * * *